United States Patent Office 3,783,012
Patented Jan. 1, 1974

3,783,012
VACUUM METALLIZED POLYOLEFINS
Koh Morita and Teiji Ishii, Yokohama-shi, Kanagawa-ken, Japan, assignors to Chisso Corporation, Osaka-shi, Japan
No Drawing. Filed June 11, 1969, Ser. No. 832,507
Int. Cl. C23c 13/02
U.S. Cl. 117—107                                         7 Claims

ABSTRACT OF THE DISCLOSURE

Vacuum metallizable polyolefin compositions are provided from a blend of a polyolefin and from about 2% to about 60% by weight of a compatible high molecular weight unsaturated material such as a natural rubber or a synthetic elastomer. Prior to vacuum metallizing, shaped articles of the composition are immersed in an acid bath. Thereafter the acid treated articles may be vacuum metallized and a protective topcoat applied. As an optional procedure, the shaped articles may be coated with a primer or undercoat after treatment in the acid bath and before vacuum metallizing.

BACKGROUND OF THE INVENTION

This invention relates to the preparation of modified polyolefin compositions that may be vacuum metallized to achieve an adherent bond of the metal to the polyolefin substrate.

It is well known that metallic coatings fail to firmly adhere to unmodified polyolefin surfaces. Many processes have been described in the literature that deal with the problem of adherability of metallic coatings to such non-conductive surfaces as synthetic polymeric materials. Some approaches to solving this problem involve modification of the polymer surface by various surface oxidation processes. For example, the polyolefin article may be chemically etched in an acidic conditioning bath. Other known processes for inducing surface oxidation include electrostatic treatment and flame treatment of the polyolefin surface. Other processes that aid in improving the bond strength between the metal layer and the polyolefin article involve application of an adhesive layer to the surface of the polymeric article.

The process of vacuum metallizing involves the deposition of thin metallic films on nonconductive surfaces utilizing the principle of the ease of evaporation of metals under the conditions of high vacuum. By employing proper conditions, a wide variety of metals such as aluminum, silver, gold and copper may be deposited on plastic substrates. The procedure for vacuum metallizing generally involves the steps of (a) degreasing and cleaning the plastic surface, then washing and drying the article; (b) applying a suitable lacquer base or undercoat and thereafter baking or drying the undercoat; (c) evaporation of the metal desired; and (d) applying a topcoat of a suitable protective lacquer and thereafter baking and drying the topcoat. The metal film deposited from the vapor in the metal evaporation or vacuum metallizing process is a thin and opaque film usually ranging from thicknesses of about 0.15 micron to about 1.0 micron. The film, because of its thinness assumes the finish of the surface exactly so that a glossy surface will have a mirror finish when coated. Therefore, one purpose of applying an undercoat is to achieve a high gloss finish. A topcoat is applied to protect the deposited film against general surface abuse and to also obtain a brilliant metallic finish. A topcoat also provides a medium for introducing color effects with transparent dyestuffs provided the topcoat does not possess a permanent color. Topcoatings conventionally employed include lacquers and paints containing resins such as melamine-formaldehyde, epoxy, polyurethane, alkyd, urea-formaldehyde and acrylic.

Polyolefins such as polymers of ethylene, propylene or 4-methylpentene-1 and their copolymers have not been widely employed as substrates for vacuum metallizing, even though they have commercial advantages in that they are inexpensive, have excellent chemical resistance, heat stability and shaping properties and also discharge little gas in vacuum. This lack of commercial acceptance is caused by the fact that the film of vaporized metal fails to firmly adhere to the polyolefin substrate. It is well known that vaporized films fail to adhere firmly to unmodified polyolefin shaped articles when the film is directly deposited to the surface of the shaped article and films also fail to firmly adhere when directly deposited on many commercially available undercoats.

SUMMARY OF THE INVENTION

It is an object of this invention to provide polyolefin compositions suitable for vacuum metallizing so that an adherent bond between the metal and the polyolefin substrate is obtained. It is a further object of this invention to provide a method for vacuum metallizing shaped polyolefin articles.

These and other objects of the invention are accomplished by blending a polyolefin and a compatible thermoplastic high molecular weight unsaturated material selected from the group consisting of natural rubber and synthetic elastomers. The unsaturated material comprises about 2% to about 60%, preferably about 4% to about 20%, by weight, based on the combined weight of the polyolefin and the rubber or synthetic elastomer. Thereafter shaped articles are formed from the polyolefin blend and the articles immersed in an acid bath, then washed and dried. Vacuum metallizing may be performed by standard procedures except that application of an undercoat is optional.

DESCRIPTION OF THE INVENTION

Polyolefins that may be blended with natural rubber and unsaturated elastomers described in this invention include polymers which contain a major proportion (i.e., greater than 50%) of an aliphatic olefin, having from 2 to 8 carbon atoms. Such polyolefins, therefore, include polyethylene, polypropylene, ethylene propylene block or random copolymers, ethylene butene-1 block or random copolymers, polybutene-1, poly(4-methylpentene-1), poly-(3-methylbutene-1), and the like. The term polyolefin as used herein is, furthermore, intended to include copolymers of hydrocarbon monomers with copolymerizable polar monomers in which such functional monomers constitute a minor proportion of the copolymer. Functional monomers frequently employed in combination with hydrocarbon monomers are in particular the acrylic monomers such as methyl methacrylate, ethyl acrylate, and acrylonitrile and the vinyl esters such as vinyl acetate. Particularly useful polyolefins are those that are substantially crystalline polymers derived from 1-alkenes having from 3 to 8 carbon atoms, i.e., polymers containing at least 25%, and preferably at least 50% crystallinity as determined by density-crystallinity relationships, a type of technique described by J. A. Gailey et al., SPE Technical Papers (ANTEC), vol. IX, Session IV–1, pages 1 to 4, February 1963.

The polyolefins may contain fillers, stabilizers, plasticizers, and other additives as needed for particular applications. Commonly employed mineral fillers that may be incorporated into the polyolefin compositions include talc, titanium dioxide, calcium carbonate, bentonite, clay, wood flour and asbestos fiber.

Both natural rubber and high molecular weight unsaturated elastomers may be admixed in the present invention.

There is no limitation as to the degree of unsaturation provided that it is sufficient to provide the usual characteristics of unsaturated materials, for example, cross-linking, reacting, etc.

The unsaturated high molecular weight materials include natural rubber and homopolymers and copolymers prepared from monomers having conjugated double bonds and other multiolefins such as butadiene, isoprene, 2,3-dimethyl-1,3-butadiene, methyl pentadiene, chloroprene, cyclopentadiene and piperylene. Representative high molecular weight unsaturated elastomers include polybutadiene, trans-polyisoprene, polychloroprene, polypiperylene, chloropreneisoprene copolymers, cyclopentadiene-isobutylene copolymers, isobutyleneisoprene copolymers and other copolymers containing the aforementioned monomers and copolymers as substantial components, i.e., at least 40% by weight. Other polymers that may be blended with the polyolefin include polymers derived from at least one monomer having a conjugated double bond and at least one monomer having no conjugated double bonds. These polymers are typified by butadiene-styrene copolymers, butadiene-acrylonitrile copolymers, chloroprenestyrene copolymers and chloroprene-acrylonitrile copolymers.

The polyolefin and the compatible natural rubber or unsaturated elastomeric modifier together with other optional additives may be blended by conventional techniques. For instance, the polyolefin and the modifier may be melt blended and mechanically stirred in such equipment as extruders, stirred mixers or milling rolls and then formed, with cooling, into molded, shaped articles that may subsequently be metallized after acid treatment. Also the polyolefin and modifier in pulverulent form may be dry blended. Alternatively, the polyolefin and the resinous modifier may be dissolved together in a hydrocarbon solvent and precipitated by cooling or by an anti-solvent or by both methods. Another technique useful in blending is to dissolve the components in a hot hydrocarbon solvent such as n-heptane followed by evaporation of the solvent. Following blending, the composition is prepared for a molding or melt-extrusion procedure and a shaping and cooling technique.

The modified polyolefins of the present invention are shaped into the article desired to be metallized by any of the means heretofore employed for the preparation of such articles inclusive of which are compression molding and injection molding.

After molding the blended polyolefin into shaped articles, the articles are immersed in an acid bath conventionally used to etch plastic surfaces. The acids of these baths include nitric acid, chromic acid-sulfuric acid mixture and a sulfuric acid bath containing potassium permanganate. The modified polyolefin shaped articles may be immersed in the acid solution at a bath temperature from room temperature to 100° C. for a time varying from several seconds to two hours. Thereafter the shaped articles are washed thoroughly with water and dried.

The acid treated shaped articles may now be vacuum metallized by conventional processes. The shaped article may first be treated with a coating of a lacquer or other suitable undercoat and thereafter evaporation of the desired metal onto the article is accomplished. To protect the thin deposited metal film, a topcoat is generally applied. An alternative method of accomplishing vacuum metallizing is to directly evaporate the desired metal onto the acid treated modified polyolefin without applying an undercoat. This treatment will result in a dull finish which may be desirable for certain purposes.

Adhesion of the metal film to the polyolefin surface may be evaluated by various laboratory scale bench tests. After the topcoat has dried, adhesion may be tested by the following procedure. Using a razor blade, the surface is scored to form a series of parallel lines about $\frac{1}{16}$" apart on the metallized surface and thereafter another series of parallel lines at right angles to the first series is made to form a cross-hatched pattern. "Scotch brand" paint testing tape or other similar adhesive tape is applied to the cross-hatched area with pressure. Then the tape is abruptly stripped from the surface. Adhesive strength is visually rated by the amount of coating remaining on the surface.

For purposes of illustrating the invention, the following examples are provided wherein, unless otherwise indicated, all parts and percentages are by weight:

Example 1

A blended polymer composition is prepared from 80 parts of a crystalline polypropylene having a melt flow rate (measured at 230° C. and under a load of 2.16 kg.) of 5.0 g./10 min. and 20 parts of a styrene-butadiene copolymer (Polysar Krylene 608, containing 48.0% styrene and available from Polymer Corporation, Ltd.). The components were mixed together and pelletized in an extruder at 200° C. The resultant pellets were shaped at 250° C. into plaques of 150 x 150 x 3 mm. with an injection molding machine.

Thereafter 10 plaques were dipped into an acid bath containing a mixture of 60% by volume of sulfuric acid, 40% by volume of water and 20 g./l. of chromic anhydride at a bath temperature of 85° C. for one minute. Next, the plaques were thoroughly washed with water and dried.

Five of the plaques were spray coated with a commercially available conventional undercoat (Undercoat U-1500, made by Toho Chemical Trade Company) and then baked and dried at 110° C. for 60 minutes. The five plaques treated with an undercoat together with the other five acid treated plaques were subject to vacuum metallizing of vaporized aluminum with a commercial "belljar" type vacuum metallizer at $10^{-4}$ mm. of mercury.

The ten vacuum metallized plaques were spray coated with an acrylic lacquer (Topcoat T900, made by Toho Chemical Trade Co.) and baked and dried at 80° C. for 30 minutes. The five undercoated plaques had a brilliant metallic finish whereas the remaining five plaques that were not undercoated had a dull surface appearance.

The plaques were allowed to stand for one day before evaluating the adhesion. Using a razor blade, a cross-hatched pattern was made on the surface and adhesive tape applied to the scored area. Following the previously described procedure for evaluating adhesion, all ten plaques received a good rating.

Example 2

Ninety-five parts of crystalline polypropylene pellets having the melt flow rate (measured at 230° C. and 2.16 kg.) of 3.5 g./10 min. and 5 parts of polybutadiene pellets (Diene NF35A, made by Asahi Chemical Industrial Co.), were blended together and pelletized with an extruder. The resultant pellets were molded at 230° C. into plaques having dimensions of 50 x 50 x 2 mm. with an injection molding machine. Then the ten pieces were immersed in the acid bath under the same conditions as in Example 1. An undercoat was applied to five of the ten plaques and thereafter all ten plaques were vacuum metallized by vapor deposition of aluminum. A topcoat of an acrylic lacquer was sprayed on all the plaques. Adhesion was evaluated according to the previously described adhesion test, and all ten plaques had good adhesion of the metal film to the modified polyolefin substrate.

Example 3

Ninety parts of the polypropylene described in Example 1 and 10 parts of a chloroprene-isoprene copolymer (Neoprene FR, available from E. I. du Pont de Nemours and Co., Inc.) were blended and pelletized with an extruder. The resultant pellets were shaped at 250° C. into plaques with the injection molding machine of Example 1.

Ten plaques were immersed in concentrated nitric acid at room temperature for 30 minutes, and thereafter the plaques were thoroughly washed with water and dried.

Then the plaques were spray coated with an undercoat of a melamineformaldehyde resin (Suncoat No. 901, made by Nagashima Paints Manufacturing Co.) and baked at 120° C. for 60 minutes.

Aluminum was vacuum deposited by evaporation on all ten plaques at $10^{-4}$ mm. of mercury, followed by topcoating with a lacquer containing a melamine-formaldehyde resin (Suncoat No. 902, made by Nagashima Paints Manufacturing Co.) and baked at 90° C. for 60 minutes. As a result, all plaques had a brilliant metallic finish.

Five plaques were subjected to the previously described adhesion test and good results were obtained for all plaques.

The remaining five plaques were subjected to a thermal cycle test which is used to evaluate physical durability of metallized plastics and adhesion of the metal film to the plastic substrate. Each plaque was subjected to three cycles wherein each cycle comprised 60 minutes at 80° C., 30 minutes at room temperature, 60 minutes at —20° C. and finally 30 minutes at room temperature. All metallized plaques passed the test and no change was observed in the vacuum metallized surfaces.

Example 4

A blend was prepared according to the procedure of Example 1 from 92 parts of a crystalline propylene-ethylene terminal block copolymer having a flow rate of 4.0 (ASTM-1238-62T) and 8 parts of the polybutadiene described in Example 2. The blend was pelletized in an extruder and thereafter plaques were molded with an injection molding machine. Five plaques were treated with the acid solution of Example 1 and under the same conditions. Thereafter the plaques were sprayed with an undercoat and vacuum metallized with aluminum. A protective topcoat of an acrylic lacquer was applied. All plaques passed the previously described adhesion test and obtained a good rating.

Example 5

Example 1 was repeated except that 90 parts of the crystalline propylene-ethylene terminal block copolymer of Example 4 was employed and 10 parts of the styrene-butadiene copolymer described in Example 1. The same procedure was followed for preparing molded plaques and for vacuum metallizing. All plaques pased the aforementioned adhesion test.

The present invention enables a metal film deposited by a vacuum metallizing technique to firmly adhere to shaped articles molded from a modified polyolefin. Such vacuum metallized polyolefins are useful in a wide variety of commercial applications. In addition to aluminum, other metals that may be applied to the modified polyolefins of this invention include silver, gold and copper.

We claim:

1. A vacuum metallized polyolefin shaped article comprising a polyolefin base member and an adherent metal layer bonded to the polyolefin base member wherein said polyolefin base member contains a blend of a substantially crystalline polyolefin and from about 2% to about 60% by weight of a compatible high molecular weight unsaturated polymer selected from the group consisting of natural rubber and synthetic elastomers, said weight based on the combined weight of said polyolefin and said unsaturated polymer.

2. A vacuum metallized article according to claim 1 wherein said polyolefin is a normally solid substantially crystalline propylene polymer.

3. A vacuum metallized article according to claim 1 wherein said polyolefin is a normally solid polypropylene.

4. A vacuum metallized article according to claim 1 wherein said polyolefin base member contains from about 4% to about 20% by weight of said compatible unsaturated polymer.

5. A vacuum metallized article according to claim 1 wherein said polyolefin is a solid propylene polymer and said high molecular weight unsaturated polymer is selected from the group consisting of polybutadiene, styrene-butadiene copolymers, and chloroprene-isoprene copolymers.

6. A vacuum metallized article according to claim 5 wherein said high molecular weight unsaturated polymer is a styrene-butadiene copolymer.

7. A vacuum metallized article according to claim 5 wherein said high molecular weight unsaturated polymer is polybutadiene.

References Cited

UNITED STATES PATENTS

| | | | |
|---|---|---|---|
| 2,656,297 | 10/1953 | Davis et al. | 161—217 X |
| 3,480,464 | 11/1969 | Lacy | 117—107 X |
| 3,505,098 | 4/1970 | Miller et al. | 117—106 X |

ALFRED L. LEAVITT, Primary Examiner

U.S. Cl. X.R.

117—138.8 E, 160 R